(12) United States Patent
Blanchard et al.

(10) Patent No.: US 9,077,167 B2
(45) Date of Patent: Jul. 7, 2015

(54) AIRCRAFT RACEWAY MOUNTING AND CLAMPING APPARATUS

(75) Inventors: Jack Blanchard, Bristol (GB); David Routledge, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 579 days.

(21) Appl. No.: 13/024,653

(22) Filed: Feb. 10, 2011

(65) Prior Publication Data
US 2011/0198465 A1  Aug. 18, 2011

(30) Foreign Application Priority Data
Feb. 16, 2010 (GB) .................................. 1002611.0

(51) Int. Cl.
| | | |
|---|---|---|
| *F16L 3/08* | (2006.01) | |
| *H02G 3/00* | (2006.01) | |
| *H02G 3/04* | (2006.01) | |
| *H02G 3/32* | (2006.01) | |

(52) U.S. Cl.
CPC ............ *H02G 3/263* (2013.01); *H02G 3/0437* (2013.01); *H02G 3/32* (2013.01)

(58) Field of Classification Search
USPC ............ 248/65, 68.1, 71, 73, 226.11, 231.51, 248/74.2, 74.5, 227.2, 228.4, 228.5, 228.7, 248/231.61, 231.81, 316.5, 316.6, 316.7; 24/335, 336, 341, 458, 115 R, 487; 174/72 A, 68.1; 439/207
See application file for complete search history.

(56) References Cited

U.S. PATENT DOCUMENTS

| | | | | |
|---|---|---|---|---|
| 4,076,199 A | * | 2/1978 | Paulsen ........................ | 248/68.1 |
| 4,118,838 A | * | 10/1978 | Schiefer et al. ............. | 24/115 R |
| 4,679,754 A | * | 7/1987 | Richards ...................... | 248/68.1 |
| 4,769,985 A | * | 9/1988 | Moritz ........................... | 59/78.1 |
| 5,235,136 A | * | 8/1993 | Santucci et al. ............. | 174/68.3 |
| 5,336,849 A | * | 8/1994 | Whitney ...................... | 174/72 C |
| 5,482,233 A | * | 1/1996 | Marko et al. .................... | 248/73 |
| 6,126,122 A | * | 10/2000 | Ismert .......................... | 248/74.1 |
| 6,504,093 B1 | * | 1/2003 | Cawley ......................... | 174/482 |
| 6,664,467 B1 | | 12/2003 | de la Borbolla | |
| 6,809,257 B2 | * | 10/2004 | Shibuya ........................ | 174/481 |

(Continued)

FOREIGN PATENT DOCUMENTS

| | | |
|---|---|---|
| EP | 0505748 | 9/1992 |
| GB | 2014643 | 8/1979 |

(Continued)

OTHER PUBLICATIONS

UK Search Report for GB1002611.0 mailed Jun. 30, 2010.

(Continued)

*Primary Examiner* — Terrell McKinnon
*Assistant Examiner* — Michael McDuffie
(74) *Attorney, Agent, or Firm* — Lowe Hauptman & Ham, LLP

(57) ABSTRACT

An aircraft raceway mounting apparatus comprising an attachment formation for attachment of the apparatus to an aircraft structure, a raceway receiving formation for receiving a raceway, the raceway receiving formation comprising a snap fit formation for retention of a raceway. An aircraft raceway clamping apparatus comprising a concave raceway receiving formation having a raceway support region and a mouth, a bridge member configured to at least partially span the mouth, a clamping member movably mounted to the bridge member to advance into the mouth.

20 Claims, 5 Drawing Sheets

(56) References Cited

U.S. PATENT DOCUMENTS

| | | | |
|---|---|---|---|
| 6,875,916 B2* | 4/2005 | Winkelbach et al. | 174/482 |
| 6,903,265 B1 | 6/2005 | VanderVelde et al. | |
| 7,223,918 B2* | 5/2007 | Gelibert | 174/95 |
| 7,301,101 B2* | 11/2007 | Suzuki | 174/68.1 |
| 7,387,282 B2* | 6/2008 | Kovac | 248/74.4 |
| 7,557,309 B2* | 7/2009 | Ross et al. | 174/481 |
| 7,569,775 B2* | 8/2009 | Makwinski et al. | 174/481 |
| 8,056,868 B2* | 11/2011 | Vander Griend | 248/74.2 |
| 8,262,035 B2* | 9/2012 | Bleus et al. | 248/68.1 |
| 8,286,923 B2* | 10/2012 | Kobayashi et al. | 248/74.2 |
| 8,609,986 B2* | 12/2013 | Edmond | 174/68.1 |
| 2003/0089515 A1 | 5/2003 | Federspiel et al. | |
| 2005/0034886 A1 | 2/2005 | Wenzler | |
| 2005/0242245 A1* | 11/2005 | Balderama et al. | 248/65 |
| 2008/0134477 A1* | 6/2008 | Hart et al. | 24/457 |
| 2009/0032651 A1* | 2/2009 | Sayres | 248/68.1 |
| 2010/0258686 A1 | 10/2010 | Sutton et al. | |
| 2012/0132465 A1* | 5/2012 | Mabuchi | 174/72 A |

FOREIGN PATENT DOCUMENTS

| | | |
|---|---|---|
| GB | 2226711 | 7/1990 |
| JP | 63240308 | 10/1988 |
| JP | 2005006387 | 1/2005 |

OTHER PUBLICATIONS

UK Search Report for GB1002611.0 mailed Oct. 4, 2010.
European Office Action for Application No. 11153898.9 mailed Jul. 5, 2013.

* cited by examiner

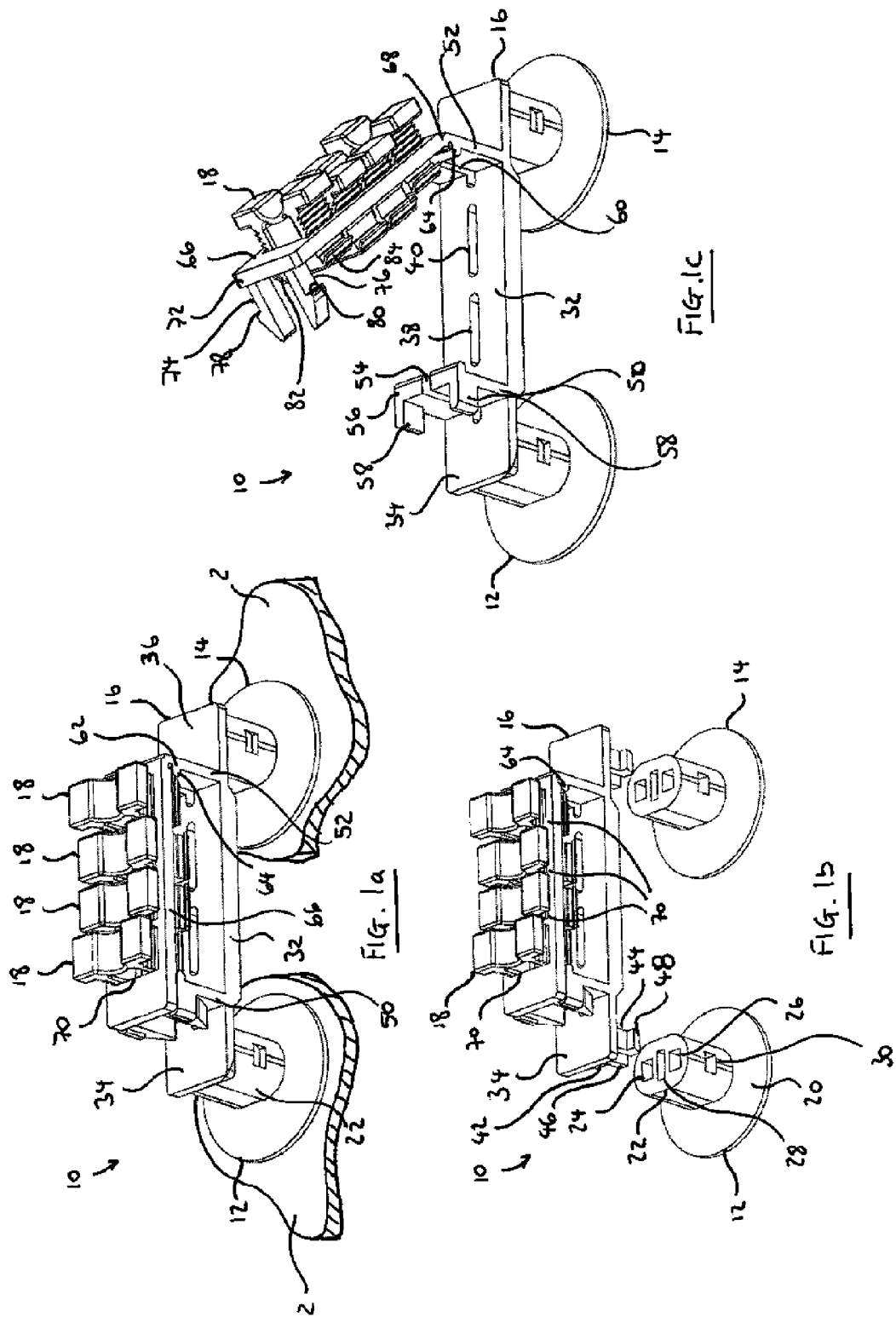

AIRCRAFT RACEWAY MOUNTING AND CLAMPING APPARATUS

RELATED APPLICATIONS

The present application is based on, and claims priority from, Great Britain Application Number 1002611.0, filed Feb. 16, 2010, the disclosure of which is hereby incorporated by reference herein in its entirety.

The present invention is concerned with a raceway mounting and clamping apparatus. More particularly, the present invention is concerned with an aircraft raceway mounting apparatus and a clamping apparatus for the retention of cables within the raceway.

Cable raceways are known, for example, from US2008/0134477. As described in that document, cable raceways are used to route cables from one part of an aircraft to another, in particular along aircraft wing sections. Cable raceways may be used to route fuel gauge data cables, fuel pump power cables, fly-by wire data cables and wing tip strobe and navigational light power cables.

US2008/0134477 shows a cable retention system comprising a number of fairlead assemblies having harpoon ties which penetrate the base of the raceway and employ a clamp member in order to retain the cables within the raceway channel.

There are various problems with this type of arrangement.

One problem is that the prior art system utilises a harpoon or cable tie which needs to penetrate the base of the raceway in order to secure the cables in position. This is disadvantageous because the harpoon or cable tie takes up space which could otherwise be filled with the cable body.

The fairlead assembly described in the prior art cannot be easily undone for replacement or servicing of the cable and needs to be cut away. This introduces the requirement for cutting apparatus to be used in the region of the cables. This is undesirable because the cables may become damaged during the cutting operation. Furthermore, there are negative cost implications in using such devices because if a cable is removed then an entire whole new set of fairlead assemblies needs to be supplied in order to re-secure the cable within the raceway.

As shown in US2008/0134477, the raceway is secured to a component of the aircraft by securing fastening elements such as bolts through holes formed in the raceway feet. This causes problems because the feet need to project sufficiently far from the side of the raceway in order to secure the fastener. If the raceway is to be replaced, the bolts or screws which secure the raceway to the aircraft component must be removed and reinserted. This may cause undesirable damage to the aircraft structure, particularly if threaded fasteners are used.

It is an aim of the present invention to overcome, or at least mitigate, one or more of the above problems.

According to the present invention, there is provided an aircraft raceway mounting apparatus comprising an attachment formation for attachment of the apparatus to an aircraft structure, a raceway receiving formation for receiving a raceway, the raceway receiving formation comprising a snap fit formation for retention of a raceway.

Advantageously, the provision of a snap fit formation allows the mounting apparatus to be secured to the aircraft structure by a permanent means (such as adhesive). The cable raceway can then be snap-fitted to the attachment formation and easily removed/replaced for servicing and/or repair.

Preferably the attachment formation is defined on a foot, the raceway receiving formation is defined on a body, and the foot and the body are attached by a snap fit arrangement. Preferably the attachment formation of the foot is a flat area suitable for adhering to an aircraft structure. Preferably the snap fit formation between the foot and the body is a releasable snap fit formation.

By providing a foot having a snap fit engagement with the body, the body is replaceable in case of damage, whilst the foot can be permanently adhered to the aircraft structure. Adhesive is the preferred method of attaching raceway structures because it does not involve making holes in the aircraft component to which the raceway is attached.

Raceways are often constructed from extruded aluminium or similar, and need to be relatively stiff to maintain their shape along their length. Therefore the body defining the snap-fit formation with the raceway needs to be deformable, making it more likely to require replacement through damage. Therefore the provision of a replaceable body is advantageous. The snap fit between the body and the feet is preferably configured such that the formation on the foot is relatively stiff (e.g. defining a bore) and the formation on the body relatively deformable (e.g. defining a resilient finger which engages the bore). This ensures that the permanently attached feet are not liable to damage, and the most likely component to require replacement is the body.

According to a second aspect of the invention, there is provided an aircraft raceway clamping apparatus comprising a concave raceway receiving formation having a raceway support region and a mouth, a bridge member configured to at least partially span the mouth, a clamping member movably mounted to the bridge member to advance into the mouth.

Advantageously, by mounting the clamping members to be moveably displaced into the mouth of the cable raceway, the cables therein can be clamped from above (i.e. from the open side of the raceway opposite the base). This means that there is no requirement for a member to project from the base of the raceway and thus, all of the space in the raceway is available for the cables.

An example aircraft raceway mounting and clamping apparatus will now be described with reference to the accompanying figures in which:—

FIG. 1a is a perspective view of a first raceway mounting and clamping apparatus in accordance with the present invention;

FIG. 1b is an exploded perspective view of the raceway mounting and clamping apparatus of FIG. 1a;

FIG. 1c is a perspective view of the raceway mounting and clamping apparatus of FIG. 1a in a semi-opened condition;

FIG. 1f is an enlarged, perspective view of a part of the raceway mounting and clamping apparatus of claim 1a;

Figure 1E:
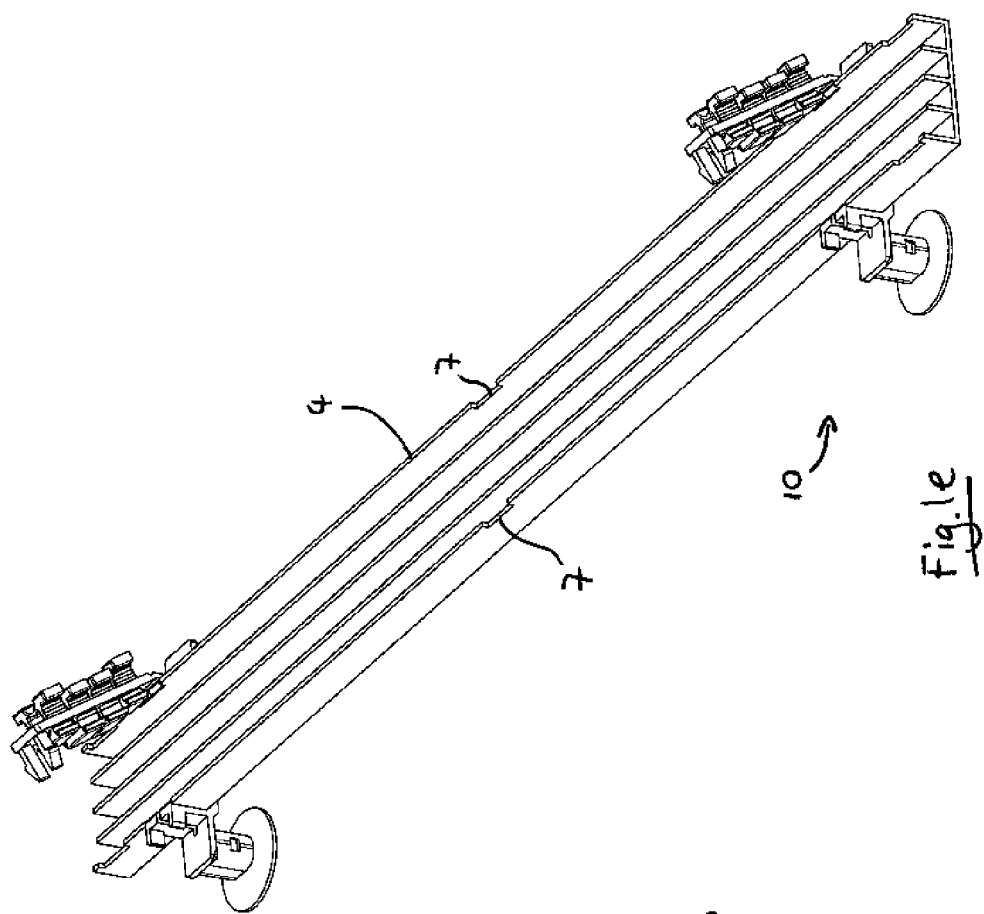
FIG. 1e is a perspective view of the raceway mounting and clamping apparatus of FIG. 1a mounted around a cable raceway and in a semi-opened condition.

Referring to FIGS. 1a to 1f, a raceway mounting and clamping apparatus 10 is shown. The apparatus 10 comprises a first foot 12, a second foot 14, a body 16 and four substantially identical clamping members 18.

The first foot 12 and the second foot 14 are substantially identical and, as such, only the first foot 12 will be described in detail. The first foot 12 comprises a disc like circular base 20 having a stand-off 22 projecting from the centre thereof. The stand-off 22 is a prismatic substantially obround body defining a first rectangular axial bore 24, a second rectangular axial bore 26 and a centre rectangular axial bore 28. The first and second rectangular axial bores are positioned either side of the centre rectangular axial bore and are substantially symmetrical about the main axis of the stand-off 22. A transverse rectangular bore 30 extends from a side wall of the stand-off 22 into communication with the second rectangular axial bore 26. It will be understood that a symmetrical transverse rectangular bore is positioned symmetrically opposite the transverse rectangular bore 30 and is in communication with the first rectangular axial bore 24.

The body 16 comprises a flat centre section 32, substantially rectangular in shape. Symmetrical wings 34, 36 extend from either end of the flat centre section 32. The flat centre section 32 defines two elongate slots 38, 40 along its centre and parallel to its long sides.

The flat centre section 32 is approximately double the thickness of the wings 34, 36.

Each of the wings 34, 36 is substantially identical and, as such, only the wing 34 will be described in detail. The wing 34 defines a first downwardly extending finger 42, a second downwardly extending finger 44 and a centre finger 46. The centre finger 46 is rectangular and is shaped to fit the centre rectangular axial bore 28 of the stand-off 22. Each of the first and second downwardly extending fingers 42, 44 comprise a substantially rectangular body having a transversely outwardly protruding tab 48.

The body 16 comprises a first side wall 50 and a second side wall 52 projecting therefrom from a side substantially opposite the downwardly extending fingers 42, 44, 46. The first side wall projects from a region where the flat centre section 32 joins the wing 34. The second side wall 52 projects from a region where the flat centre section 32 joins the wing 36.

The first side wall 50 defines a slot 54 extending from the flat centre section 32 to an edge 56 opposite the flat centre section 32. The first side wall 50 further comprises a pair of support lugs 58 projecting out of the plane of the first side wall 50 proximate the edge 56 and in the direction of the wing 34. The first side wall 50 comprises a semi-circular snap lug 51 extending at the edge 56 in an opposite direction to the support lugs 58.

The second side wall 52 comprises a slot 60 extending from the region of the flat centre section 32 to an upper edge 62 opposite the flat centre section 32. A semi-circular snap lug 64 extends from the edge 62 in a direction opposite to the wing 36.

A bridge 66 extends from the second side wall 52. The bridge 66 is an elongate rectangular member which is connected to the edge 62 of the second side wall 52 by film hinge 68. The bridge 66 defines four rectangular through bores 70 equally spaced along its length. At a free end 72 of the bridge 66 a pair of symmetrical downwardly depending fingers 74, 76 are disposed. Each of the fingers 74, 76 is generally rectangular and comprises a lock tab 78 extending transverse therefrom. The lock tabs 78 are substantially triangular in shape having a shoulder 80 facing the bridge 66.

The four clamping members 18 are substantially identical. Each clamping member 18 is hollow and rectangular in profile having a first side 82 and a second side 84. The sides 82, 84 are joined by a resilient 'U' shaped section 86 which is convex towards the sides 82, 84. A pair of finger tabs 88, 90 extend from either side of the resilient 'U' shaped section 86.

Each of the sides 82, 84 defines a number of externally-facing ratchet teeth 92 which are triangular in shape and thereby define horizontal shoulders which face the finger tabs 88, 90. At the end of each side 82, 84 opposite the finger tabs 88, 90 wings 94 are defined which extend in the same direction as, but further than, the ratchet teeth.

A pressure plate 96 extends between the first side 82 and the second side 84 opposite the resilient 'U' shaped section 86.

The raceway mounting and clamping apparatus 10 is assembled as follows.

The circular bases 20 are attached to an aircraft component 2 such as a spar of an aircraft wing. The body 16 is attached to the feet 12, 14 by inserting the downwardly extending fingers 42, 44, 46 into the respective corresponding rectangular axial bores 24, 26, 28 of the stand-off 22. As the fingers enter the bores the first and second downwardly extending fingers are resiliently urged together due to the presence of the tabs 48. Once the wings 34, 36 engage the top of the stand-offs 22, the tabs 48 can engage the transverse rectangular bore 30 at which point each of the first and second downwardly extending fingers 42, 44 snap into place. In this manner, the body 16 is snap-fitted to the feet 12, 14. It will be noted that should removal be desired, a user can access and press the tabs 48 through the transverse rectangular bores 30 in order to resile the first and second downwardly extending fingers 42, 44 inwardly in order to release the body 16.

Each of the clamping members 18 is inserted into one of the four through bores 70 in the bridge 66. As they are inserted, the wings 94 resiliently deflect inwardly and snap outwardly as the clamping member 18 passes through the bore 70. In order to advance the clamping member 18 further, they can simply be pressed towards the bridge 66. The ratchet teeth 92 engage with the sides of the through bore 70 thus ratcheting the clamping members downwards. The clamping members 18 cannot be moved in the opposite direction (upwardly) as the ratchet teeth engage against the underside of the bridge 66. Furthermore, the clamping members 18 cannot be removed from the bridge 66 due to the presence of the wings 94 which inhibit complete removal.

If it is desired to retract the clamping members 18, this can be done by squeezing the finger tabs 88, 90 such that the radius of the resilient 'U' shaped section 86 is increased. This pushes the sides 82, 84 inwardly towards each other thus disengaging the ratchet teeth 92 from the bore 70. It will be noted that a positive user intervention is required to release the clamping members 18 thus avoiding accidental release.

The bridge 66 can be rotated about the film hinge 68. The bridge 66 can be rotated such that the fingers 74, 76 can pass between the lugs 58 of the first side wall 50. As this occurs, the fingers 74, 76 resiliently deform towards each other due to the lock tabs 78. Once the shoulder 80 has passed beneath the lugs 58, the fingers 74, 76 can snap back into position. In this way, the bridge 76 is secured in position parallel to the flat centre section 32. The snap lugs 51, 64 support the bridge 66 in this parallel position.

The raceway mounting and clamping apparatus 10 can be used to mount and clamp a raceway 4 (see FIGS. 1d and 1e, as follows).

A typical cable raceway 4 comprises a base 5 having parallel troughs or channels 6. The raceway 4 comprises a set of periodic parallel grooves 7 in its outer walls along its length.

Once the raceway mounting and clamping apparatus 10 has been installed on an aircraft component 2, the raceway 4 is inserted between the side walls 50, 52. As this occurs, the side walls are resiliently deformed outwardly due to the presence of the snap lugs 51, 64. Once the raceway 4 has been inserted, the side walls 50, 52 can resile back to their original position as the snap lugs 51, 64 sit in the grooves 7.

Figure 1D:
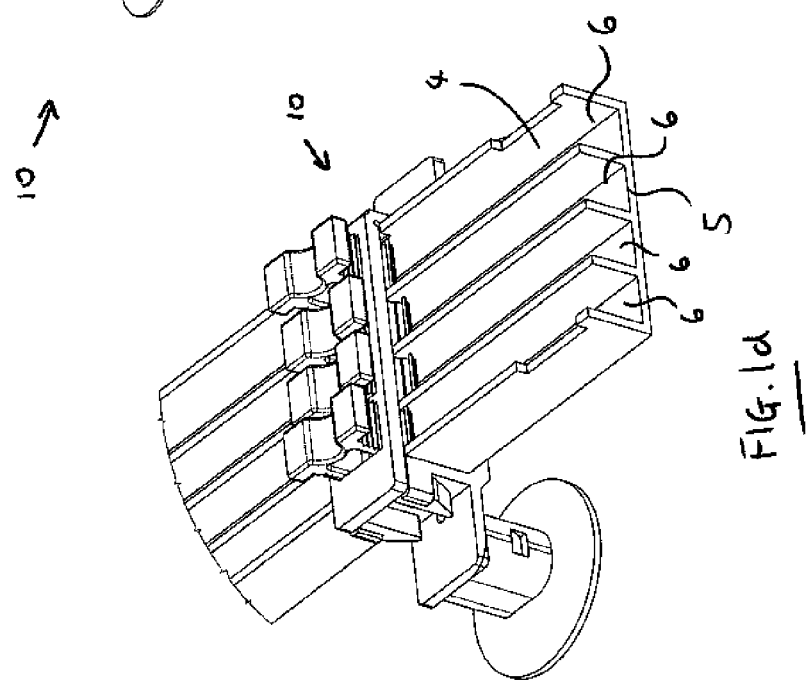
FIG. 1d is a perspective view of the raceway mounting and clamping apparatus of FIG. 1a installed around a cable raceway.
Figure 1F:
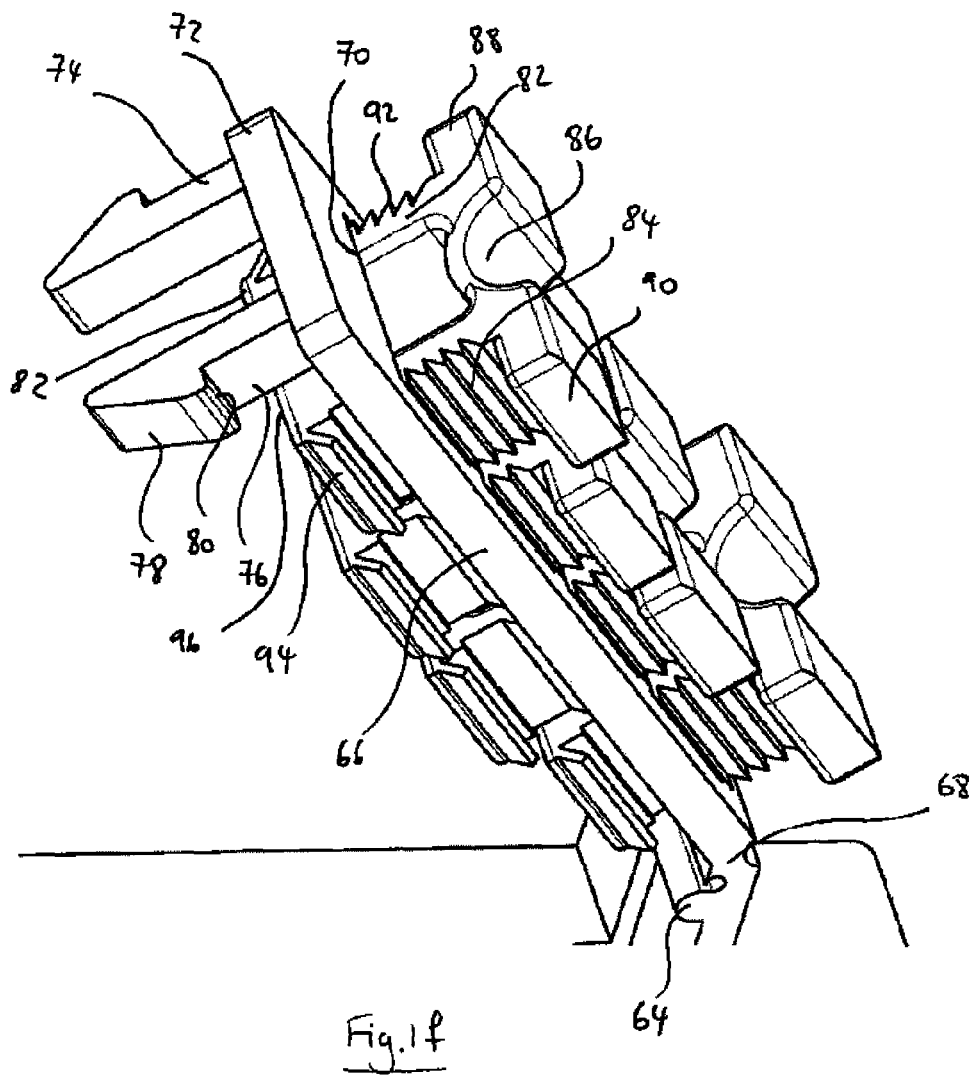

Once the raceway 4 is in the position shown in FIG. 1*e*, cables can be inserted into the various grooves 6. Once the cables are in position, and the installer wishes to clamp them in place, the bridge 66 can be rotated into its position parallel to the flat centre section 32 as shown in FIG. 1*d*. Each of the cables within the individual troughs or channels 6 can then be secured by pushing each of the individual clamping members 18 towards the cables, i.e. into the mouths of the troughs 6.

Figure 2A:
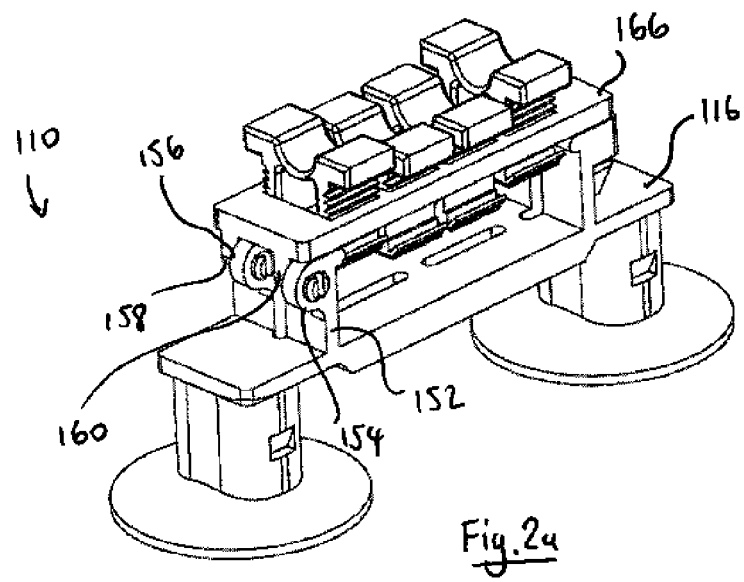
FIG. 2a is a perspective view of a second raceway mounting and clamping apparatus in accordance with the present invention.
Figure 2B:
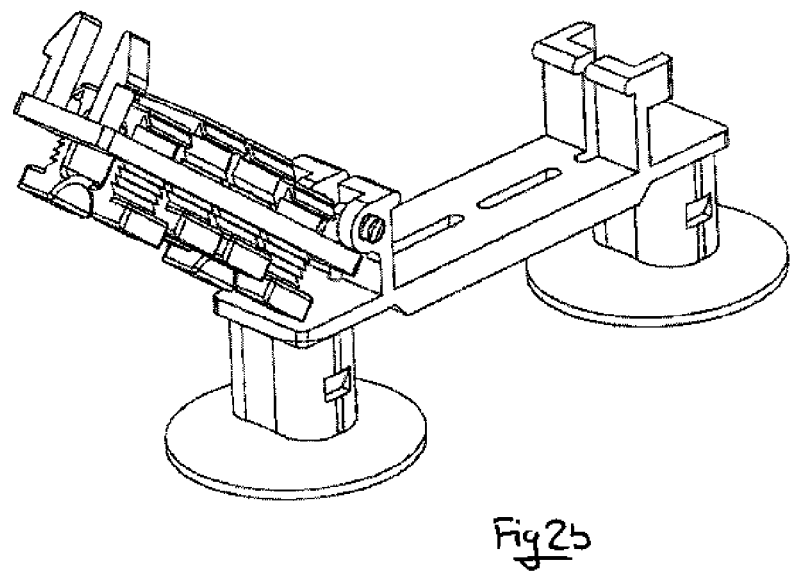
FIG. 2b is a perspective view of the raceway mounting and clamping apparatus of FIG. 2a in a semi-opened condition.

FIG. 2*a* shows a raceway mounting and clamping apparatus 110 which is similar to the raceway mounting and clamping apparatus 10 except for the fact that a film hinge is not provided. Instead, a second side wall 152 comprises a pair of hinge lugs 154, 156 which have through bores defined therethrough. The bridge 166 is a separate component from the body 116 and also comprises opposing hinge lugs 158, 160. A first hinge pin 162 is inserted through both the hinge lug 154 and the opposing hinge lug 158 and a second hinge pin 164 is inserted through both the hinge lug 156 and the opposing hinge lug 160 to form a pair of axially aligned hinges. This creates a hinge mechanism which, although more complex, is less reliant on the manufacturing tolerances of a film hinge as shown in the raceway mounting and clamping apparatus 10.

Figure 3A:
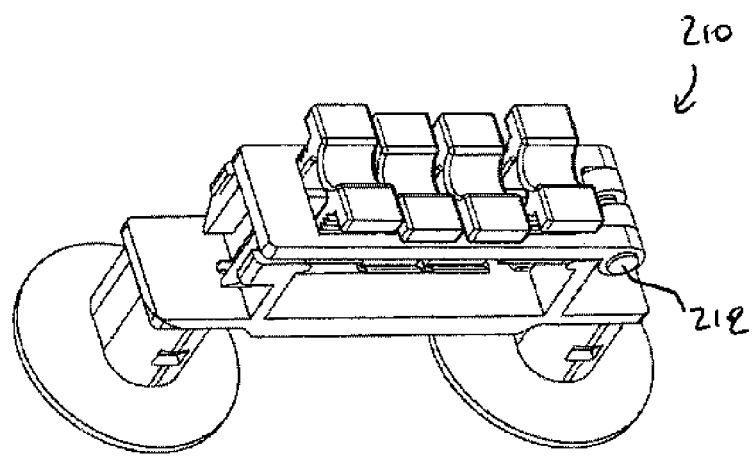
FIG. 3a is a perspective view of a third raceway mounting and clamping apparatus in accordance with the present invention.
Figure 3B:
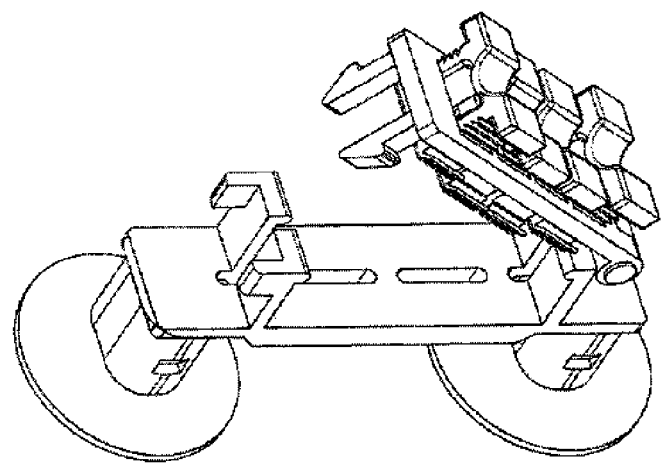
FIG. 3b is a perspective view of the raceway mounting and clamping apparatus of FIG. 3a in a semi-opened condition.

Referring to FIGS. 3*a* and 3*b*, a raceway mounting and clamping apparatus 210 is shown. In this example, individual pairs of hinge lugs are also provided, however, a single hinge pin 212 is passed through both the body and the bridge in order to provide the pivot.

It will be noted that variations of the above embodiments fall within the scope of the present invention.

The feet 12, 14 do not have to be adhered to the aircraft surface. They may be bolted, screwed or employ any other known attachment method.

A raceway clamping arrangement may comprise a body 16 without the bridge 66 to secure the raceway in place via a snap fit. Traditional cable ties or fairlead assemblies may then be used to secure each of the cables in place. Alternatively, the use of the clamping members extending from a bridge snap-fitted over the race way may be used independently of the snap fit attachment of the body 16 to the raceway 4.

The clamping members 18 may utilise other clamping arrangements, e.g. they may be threaded members.

The invention claimed is:

1. An aircraft raceway mounting apparatus comprising:
   a foot defining an attachment formation at a first end for attachment of the apparatus to an aircraft structure,
   a body defining a raceway receiving formation for receiving a raceway, the raceway receiving formation comprising a snap fit formation for retention of a raceway,
   wherein the body is attached to the foot at a second end by a snap fit arrangement such that the body is spaced from the aircraft structure in use,
   wherein the raceway receiving formation comprises a body having a U-shaped channel for receiving a raceway, and
   wherein the U-shaped channel comprises a base, a first sidewall and a second sidewall, and the snap fit formation comprises lugs projecting into the U-shaped channel from the sidewalls.

2. An aircraft raceway mounting apparatus according to claim 1 comprising a retention member configured to engage the raceway receiving formation to further retain a raceway.

3. An aircraft raceway mounting apparatus according to claim 2 in which the raceway receiving formation defines a mouth for insertion of a raceway, and the retention member spans the mouth.

4. An aircraft raceway mounting apparatus according to claim 2 in which the retention member is secured into position against the receiving formation with a snap fit.

5. An aircraft raceway mounting apparatus according to claim 2 in which the retention member is pivotably mounted to the receiving formation.

6. An aircraft raceway mounting apparatus according to claim 1 in which the snap fit formation between the foot and the body is a releasable snap fit formation.

7. An aircraft raceway mounting apparatus, comprising:
   a foot defining an attachment formation at a first end for attachment of the apparatus to an aircraft structure,
   a body defining a raceway receiving formation for receiving a raceway, the raceway receiving formation comprising a snap fit formation for retention of a raceway,
   wherein the body is attached to the foot at a second end by a snap fit arrangement such that the body is spaced from the aircraft structure in use, wherein the raceway receiving formation defines a mouth for receiving a raceway, the apparatus comprising a bridge member configured to at least partially span the mouth, and a clamping member movably mounted to the bridge member to advance into the mouth.

8. An aircraft raceway clamping apparatus comprising:
   a concave raceway receiving formation having a raceway support region and a mouth configured for receiving a multi-channel raceway,
   a bridge member configured to at least partially span the mouth,
   a plurality of separate and independent clamping members movably mounted to the bridge member to advance into individual channels of a multi-channel raceway positioned in the mouth in use.

9. An aircraft raceway clamping apparatus according to claim 7 in which the bridge member and the raceway receiving formation are engageable via a snap fit formation.

10. An aircraft raceway clamping apparatus according to claim 7 in which the bridge member is hinged to the raceway receiving formation.

11. An aircraft raceway clamping apparatus according to claim 10 in which the bridge member is hinged to the raceway receiving formation via a film hinge.

12. An aircraft raceway clamping apparatus according to claim 7 in which the bridge member defines a bore, and the clamping member is received in the bore.

13. An aircraft raceway clamping apparatus according to claim 7 in which the clamping member is advanceable via a ratchet formation such that movement of the clamping member out of the mouth is resisted by the ratchet.

14. An aircraft raceway clamping apparatus according to claim 13 in which the ratchet formation comprises a plurality of teeth defined on the clamping member engageable with a surface of the bridge member.

15. An aircraft raceway clamping apparatus according to claim 13 in which the ratchet formation is releasable to allow movement of the clamping member out of the mouth.

16. An aircraft raceway clamping apparatus according to claim 15 in which the clamping member is deformable to release the ratchet formation.

17. An aircraft raceway clamping apparatus according to claim 8, wherein the clamping member is advanceable via a ratchet formation such that movement of the clamping member out of the mouth is resisted by the ratchet.

18. An aircraft raceway clamping apparatus according to claim 17, wherein the ratchet formation comprises a plurality of teeth defined on the clamping member engageable with a surface of the bridge member.

19. An aircraft raceway clamping apparatus according to claim 8, wherein the mouth defines a first sidewall and a second sidewall, each sidewall defining lugs projecting into the mouth to provide snap-fit retention of a raceway.

20. An aircraft raceway clamping apparatus comprising:
- a concave raceway receiving formation having a raceway support region and a mouth,
- a raceway disposed within the mouth, the raceway having a plurality of channels,
- a bridge member configured to at least partially span the mouth,
- a plurality of separate and independent clamping members movably mounted to the bridge member to advance into individual channels of the raceway.

\* \* \* \* \*